United States Patent
Kim

(10) Patent No.: US 7,574,130 B2
(45) Date of Patent: Aug. 11, 2009

(54) MOBILE COMMUNICATION TERMINAL HAVING CAMERA FUNCTION AND METHOD OF CONTROLLING PHOTOGRAPHING PROCESS THEREOF

(75) Inventor: Woo Sung Kim, Incheon (KR)

(73) Assignee: Pantech Co., Ltd., Seoul (KR)

( * ) Notice: Subject to any disclaimer, the term of this patent is extended or adjusted under 35 U.S.C. 154(b) by 340 days.

(21) Appl. No.: 11/311,047

(22) Filed: Dec. 19, 2005

(65) Prior Publication Data
US 2006/0133797 A1 Jun. 22, 2006

(30) Foreign Application Priority Data
Dec. 20, 2004 (KR) ...................... 10-2004-0108855

(51) Int. Cl.
*G03B 17/00* (2006.01)
(52) U.S. Cl. .................................... 396/266
(58) Field of Classification Search ................. 396/349, 396/266, 85; 348/14.02
See application file for complete search history.

(56) References Cited

U.S. PATENT DOCUMENTS

| 5,155,520 A * | 10/1992 | Nagasaki et al. | 396/53 |
| 6,654,559 B2 * | 11/2003 | Aoyama | 396/266 |
| 6,911,969 B1 * | 6/2005 | Nelson et al. | 345/163 |
| 2001/0014214 A1 * | 8/2001 | Hayashi et al. | 396/85 |
| 2003/0007012 A1 * | 1/2003 | Bate | 345/825 |
| 2003/0164890 A1 * | 9/2003 | Ejima et al. | 348/333.1 |
| 2003/0199995 A1 * | 10/2003 | Ishii et al. | 700/9 |
| 2004/0008420 A1 * | 1/2004 | Ohashi | 359/680 |

FOREIGN PATENT DOCUMENTS

| JP | 2004-120627 | 4/2004 |
| JP | 2004-184817 | 7/2004 |
| JP | 2004-246023 | 9/2004 |
| KR | 1020030097113 | 12/2003 |

* cited by examiner

*Primary Examiner*—Melissa Jan Koval
*Assistant Examiner*—Autumn Parker
(74) *Attorney, Agent, or Firm*—H.C. Park & Associates, PLC

(57) ABSTRACT

Disclosed is a mobile communication terminal having a camera function and a method of controlling a photographing process thereof. According to an embodiment of the disclosure, the mobile communication terminal comprises two buttons relating to the camera function positioned separately on a main body of the terminal. A first button is a photographing button that captures an image when on-state and a second button is a supporting button, provided the user chooses to activate this function. In this setup, the mobile communication terminal protrudes a camera lens or takes a photograph only when the first and the second buttons are in the on state. Accordingly, it is possible to reduce the possibility of dropping the terminal due to carelessness during photography, and to decrease the possibility of damaging the camera lens even when the terminal is dropped on the ground.

6 Claims, 7 Drawing Sheets

Fig. 7A

| Photographing | First button |
|---|---|
| Supporting | Second button |

Fig. 7B

| Photographing | Second button |
|---|---|
| Supporting | First button | ns # MOBILE COMMUNICATION TERMINAL HAVING CAMERA FUNCTION AND METHOD OF CONTROLLING PHOTOGRAPHING PROCESS THEREOF

CROSS-REFERENCE TO RELATED APPLICATION

The present application is claiming priority of Korean Patent Application No. 10-2004-108855, filed on Dec. 20, 2004, the content of which is herein incorporated by reference.

BACKGROUND OF THE INVENTION

1. Field of the Invention

The present disclosure relates to a mobile communication terminal having a camera function and a method of controlling a photographing process thereof. Particularly, the present disclosure relates to a mobile communication terminal having a camera function, and to a method of controlling a photographing process thereof capable of reducing the possibility of dropping the terminal due to carelessness, decreasing the chance of damage to the camera lens even if the terminal is dropped. The present disclosure relates also to a method for obtaining an upright photographed image even when taking a photograph with the mobile communication terminal turned upside down.

2. Background of the Related Art

In recent years, as communication-related technology has rapidly developed, mobile communication terminals with camera functionality have become increasingly widespread. FIG. 1 shows how photographs were captured by prior state of the art mobile communication terminals with cameras.

Typically, when taking a photograph with the prior mobile communication terminal 10, as shown in FIG. 1, a user supports a bottom surface of a main body 11 with fingers 15, 16, and then pushes a button 12 with another finger to take a photograph of a subject for photography.

In this case, a camera lens 13 may be structured to outwardly protrude from the main body 11 by a predetermined distance or to return to the main body 11, according to an operation of a zoom mode of the mobile communication terminal 10. By doing so, the user can fit the subject located at a long or short distance to a desired focus and then take a photograph precisely.

When taking a photograph with the mobile communication terminal 10, the user pushes button 12 with finger 14. To take the photograph, the user must simultaneously support the bottom surface of main body 11 with fingers 15 and 16 in order to counteract the downward force of pushing button 12, thereby preventing the terminal from falling to the floor.

That is, when taking a photograph, the mobile communication terminal 10 may be supported by applying force, which corresponds to the force of pushing the button 12, to the opposite surface of the button 12. In this case, we refer to the pressing of button 12 as the "forcing point" and the corresponding force provided by fingers 15 and 16 as the "supporting point." Mobile communication terminal 10 is thus best supported when the forces applying the forcing point and the supporting point are in balance to one another.

If the mobile communication terminal 10 receives a call or message when not supported stably in a user's grasp, the user's distraction may cause the user to drop the mobile communication terminal 10 on the ground. In this way, if the mobile communication terminal 10 is dropped on the ground during the photographing, the mobile communication terminal 10 may receive an unexpected great shock.

Since most constituent parts of the mobile communication terminal 10 are stably mounted in the main body 11, most consitutuent parts can still maintain normal function even after receiving a shock. However, if the mobile communication terminal 10 is dropped on the ground with camera lens 13 protruding outwardly from main body 11, camera lens 13 is highly damaged compared to other parts.

In the mean time, when taking a photograph of a specific subject (for example, a user's face) with the mobile communication terminal 10, as shown in FIG. 2, the user performs an unnatural action such as changing a position of a hand or up-and down positions of the mobile communication terminal 10. FIG. 2 shows a situation where a mobile communication terminal 10 is turned upside down for use of the camera function. As shown in FIG. 2, camera lens 13 faces the user. In FIG. 2, the user can take a photograph by pushing the camera button 12 with finger 15.

However, FIG. 2 also reveals that grasping the mobile communication terminal 10 unnaturally (turned upside down) and taking a photograph in this fashion increases the possibility of dropping mobile communication terminal 10. Further, photographed images taken from an upside down mobile communication terminal 10 appear inverted.

In order to turn the photographed image (I) 180 degrees into an upright position, the user must enter the "photographed product-previewing mode"—one of the many functions included in mobile communication terminal 10—and adjust the up-down position of the photographed image (I). This function is the only way in which the user can accommodate the inconvenience of correcting photographed images that are stored upside down.

SUMMARY OF THE INVENTION

Accordingly, the present disclosure has been made to solve the above-mentioned problems occurring in the prior art. The object of the present disclosure is to provide a mobile communication terminal having a camera function capable of basically interrupting the protrusion of the camera lens unless a user supports the mobile communication terminal stably when taking a photograph. This would prevent the camera lens from being damaged if the mobile communication terminal were to be dropped during photography.

Another object of the present disclosure is to provide a mobile communication terminal capable of storing an erect photographed image even when the mobile communication terminal is turned upside downduring photography.

In order to accomplish the objects, there is provided a mobile communication terminal, having a camera function, comprising: a main body having a camera lens; at least one photographing button and at least one supporting button mounted to an outside of the main body; a camera function module for performing a camera function according to pushed states of the photographing button and the supporting button to produce a photographed image; and a lens protruding control module for checking whether the supporting button is pushed when the photographing button is pushed to outwardly protrude the camera lens from the main body or return the camera lens to the main body according to the checking result.

According to another aspect of the invention, there is provided a method of controlling a photographing process of a mobile communication terminal having a camera function module, comprising steps of: determining whether a photographing button is pushed; determining whether a supporting button is pushed when the photographing button is pushed; and communicating with the camera function module to protrude a camera lens when the supporting button is pushed.

BRIEF DESCRIPTION OF THE DRAWINGS

The above and other objects, features and advantages of the present invention will be more apparent from the following detailed description taken in conjunction with the accompanying drawings, in which:

FIG. 7A conceptually shows how an embodiment of the present disclosure stores information via a button settling specification-storing buffer;

FIG. 7B conceptually shows how another embodiment of the present disclosure stores information via a button settling specification-storing buffer;

DETAILED DESCRIPTION OF THE PREFERRED EMBODIMENTS

Hereinafter, preferred embodiments of the present invention will be described with reference to the accompanying drawings. In the following description of the present invention, a detailed description of known functions and configurations incorporated herein will be omitted when it may make the subject matter of the present invention rather unclear.

Figure 1:
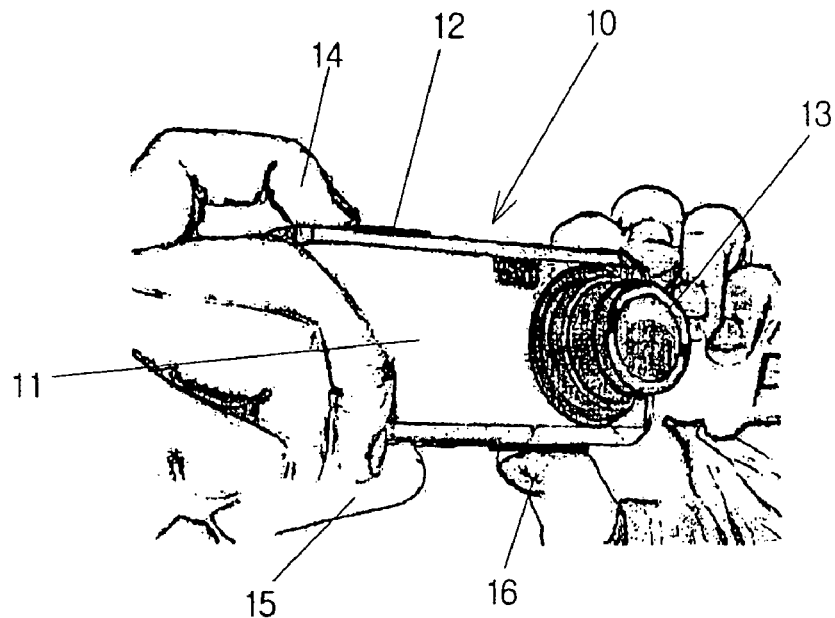
FIG. 1 shows a use of a mobile communication terminal, having a camera function, according to the prior art.
Figure 2:
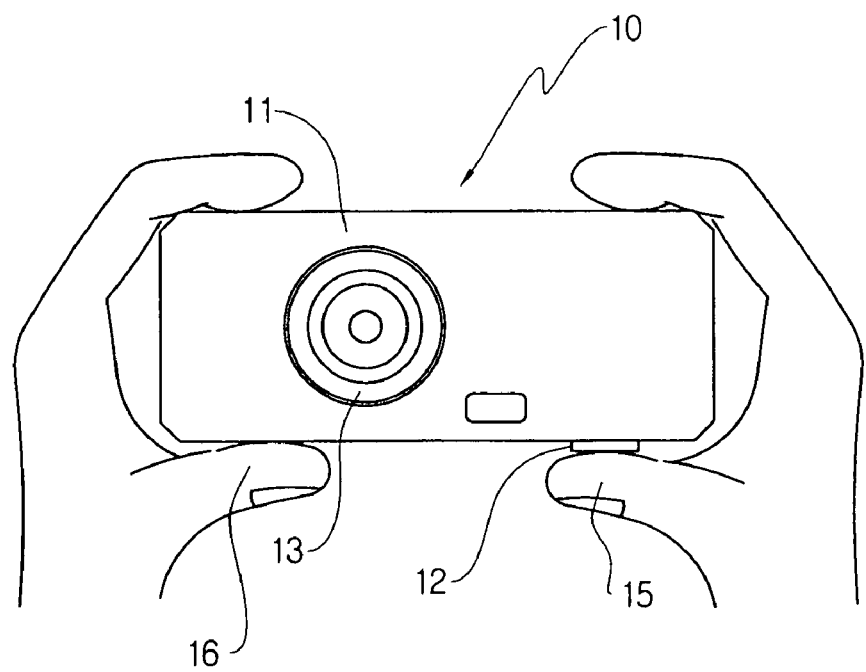
FIG. 2 shows a use of a mobile communication terminal, having a camera function, while the mobile communication terminal is turned upside down, according to the prior art.
Figure 3:
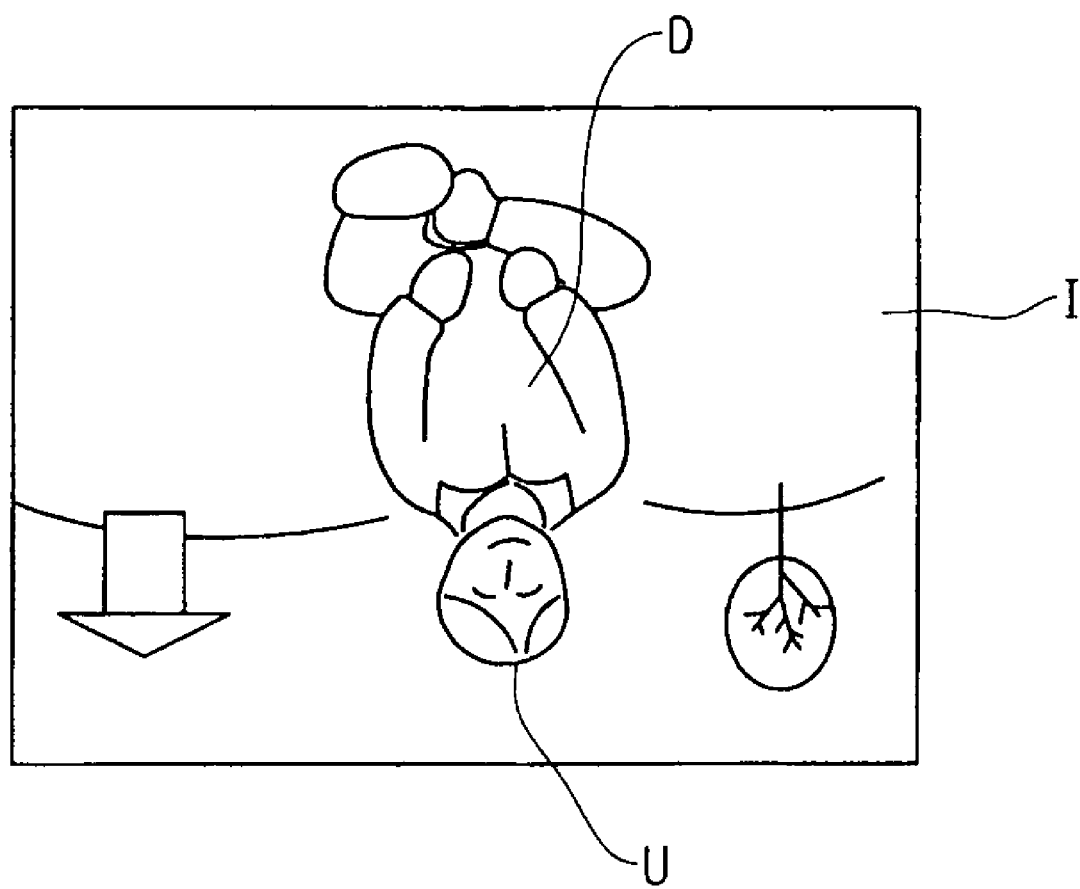
FIG. 3 shows an example of a photographed image that is produced by an inverted mobile communication terminal with a camera function according to the prior art.
Figure 4:
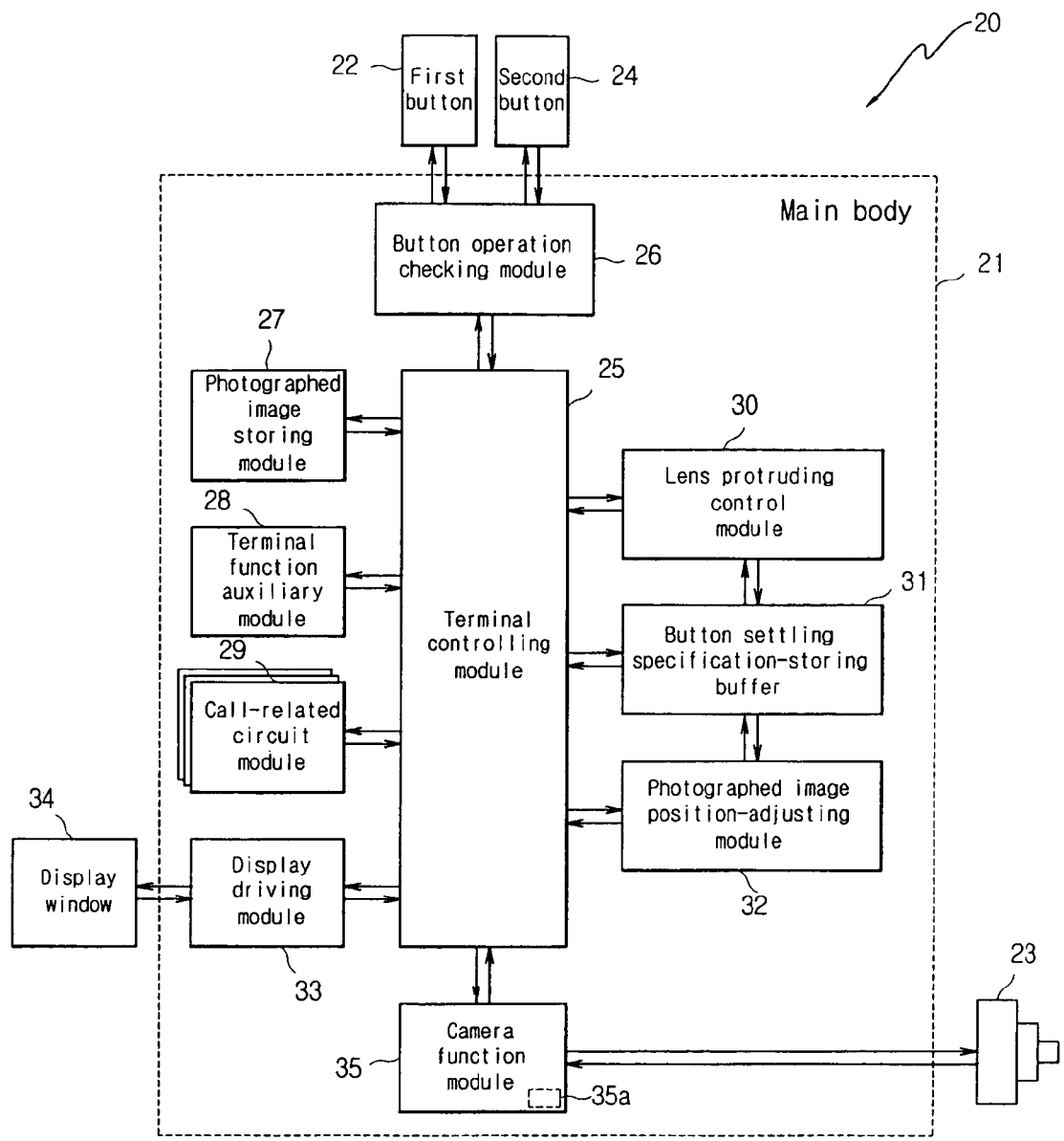
FIG. 4 is a block diagram of an internal structure of a mobile communication terminal according to an embodiment of the present disclosure.

FIG. 4 is a block diagram showing an internal structure of a mobile communication terminal according to an embodiment of the invention. As shown in FIG. 4, a mobile communication terminal 20 according to an embodiment of the invention comprises a main body 21, terminal controlling module 25 mounted in main body 21, terminal function auxiliary module 28 (for example, contents memory, program memory and keypad driving module, etc.) which is computer-managed under control of terminal controlling module 25, call-related circuit module 29 (for example, signal transmitter, signal receiver, antenna, duplexer, base-band, frequency synthesizer, modulator, demodulator, etc.), display driving module 33, camera function module 35 and photographed image storing module 27.

Display driving module 33 serves to display various characters (or numerals), pictures and images, etc., through display window 34, under control of the terminal controlling module 25.

Camera function module 35 performs a camera function to produce a photographed image according to pushed states of a first button 22 and a second button 24 which are mounted to be outwardly exposed from the main body 21. Preferably, the camera function module 35 may be structured to perform the camera function only when the first and second buttons 22, 24 are pushed together. In this case, the camera function module 35 protrudes or returns a camera lens 23 to focus and then electrically (electronically) processes incident light through the camera lens 23, thereby producing a photographed image.

Photographed image storing module 27 serves to store and manage the photographed image produced by camera function module 35, under control of the terminal controlling module 25.

The first and second buttons 22, 24 are buttons related to the camera function, wherein one of the buttons is set as a photographing button and the other is set as a supporting button. Preferably, the first and second buttons 22, 24 may be settled separately on opposing surfaces of the main body, for example, an upper surface and a bottom surface of the main body 21. Settling positions and number of the first and second buttons may be variously changed according to using conditions. The first and second buttons will be more specifically explained later.

Button operation checking module 26 checks whether first and second buttons 22 and 24 are pushed while not controlled by terminal controlling module 25, and transmits the result to terminal controlling module 25. By doing so, a series of photographed image producing processes performed by camera function module 35 proceed normally.

Figure 5:
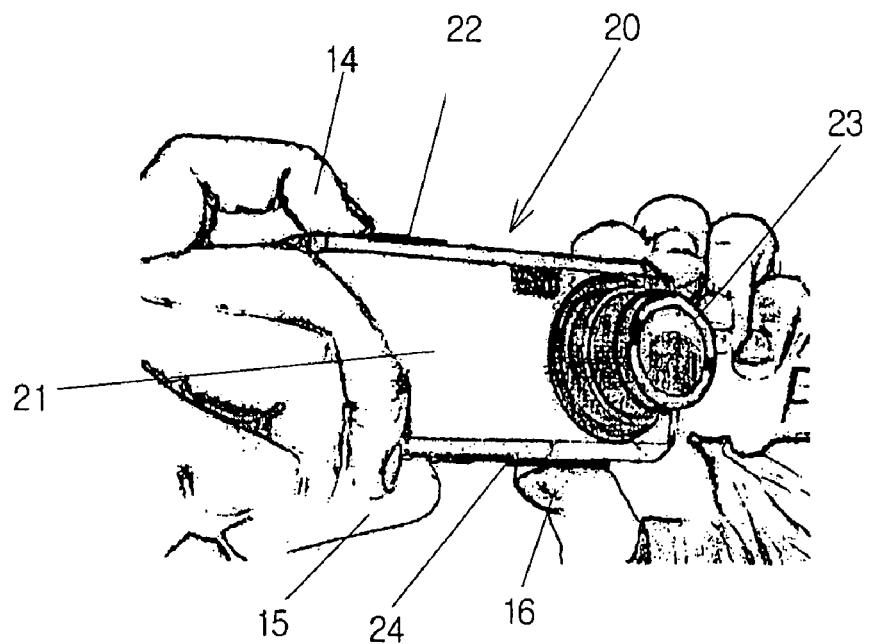
FIG. 5 illustrates a typical use of a mobile communication terminal having a camera function according to the present disclosure.
Figure 6:
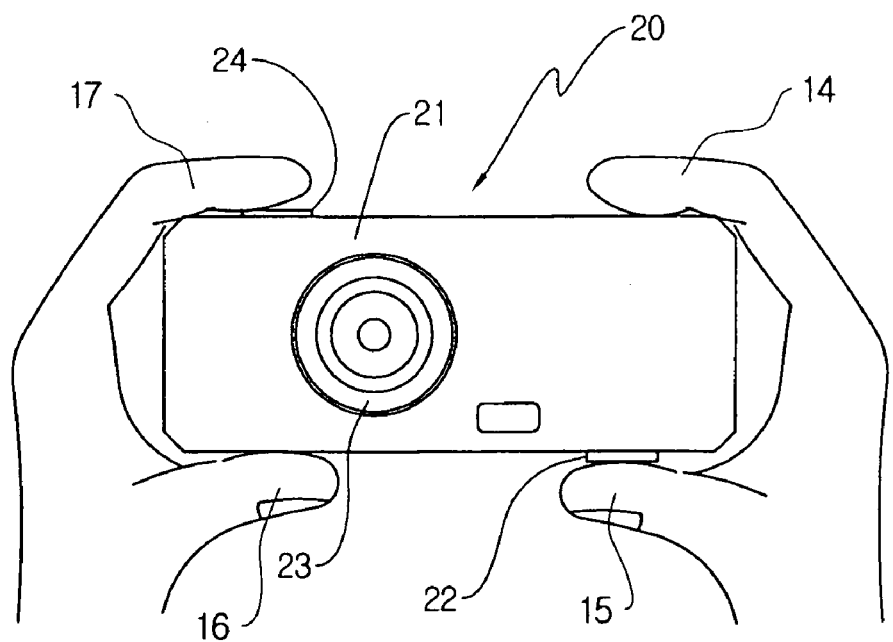
FIG. 6 shows an inverted mobile communication terminal, having a camera function, according to an embodiment of the present disclosure during use of its camera function.
Figure 8:
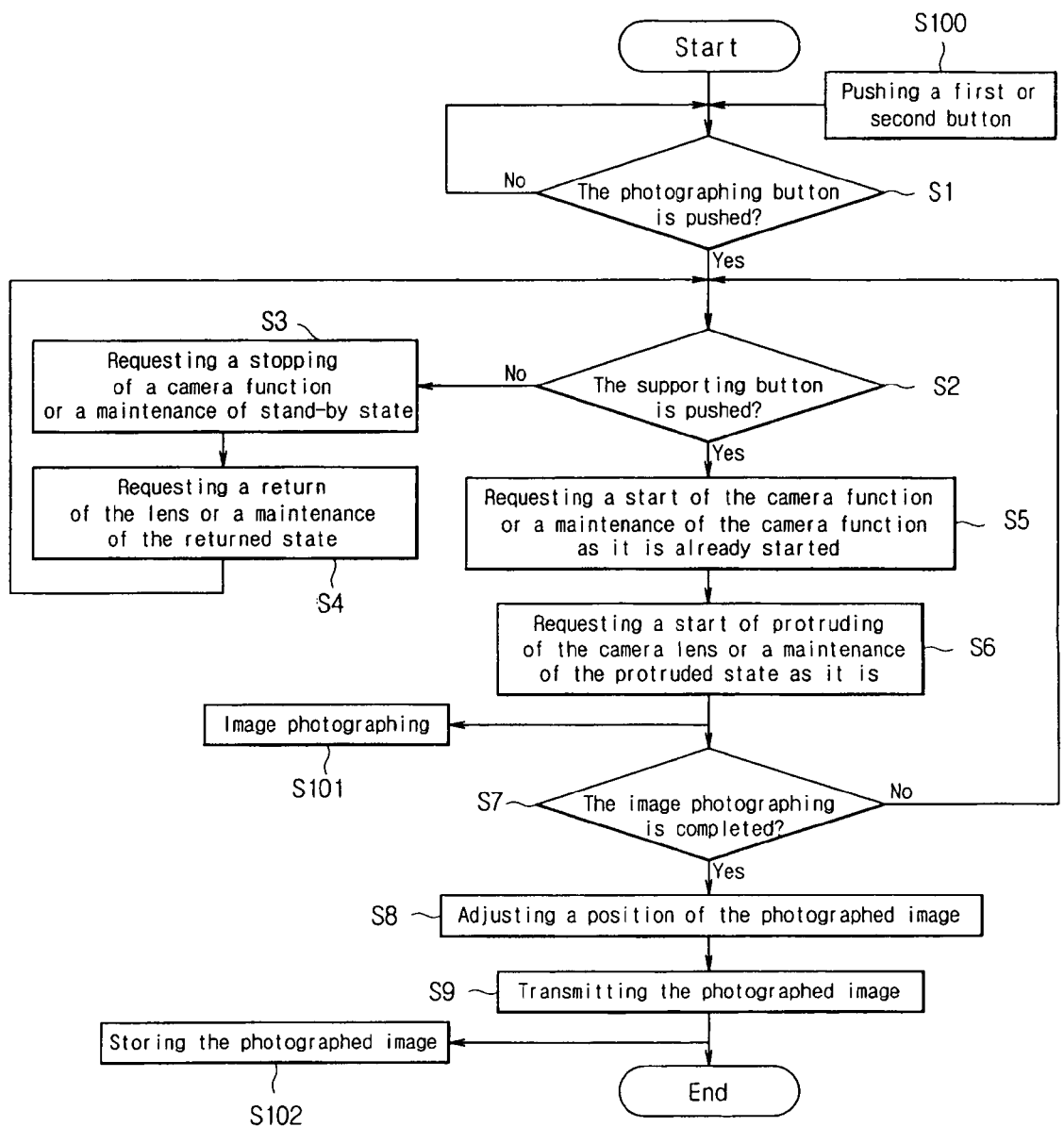
FIG. 8 is a flow chart showing a method of controlling a photographing process of a mobile communication terminal according to an embodiment of the present disclosure.

FIGS. 5 and 6 illustrate photographing states using the mobile communication terminal having a camera function according to an embodiment of the present disclosure. Since the buttons related to the camera function are located separately as the first and second buttons 22, 24, a user can take a photograph with the mobile communication terminal being turned upside down as shown in FIG. 6 as well as with the mobile communication terminal being set upright as shown in FIG. 5. In other words, in the embodiment shown in FIG. 5, a user supports the bottom surface of main body 21 with fingers 15 and 16 and then can take a photograph of a subject for photography by pushing first button 22 with finger 14. Alternatively, in the embodiment shown in FIG. 6, a user can also support the upper surface of main body 21 with fingers 15 and 16 and then take a photograph of a subject for photography (for example, a user's face, etc.) by pushing second button 24 located on the bottom surface of the main body with finger 17.

In this case, camera lens 23 protrudes outwardly from main body 21 by a predetermined length or returns to main body 21 under control of a camera lens driving part 35a (refer to FIG. 4) belonging to camera function module 35, thereby guiding the user to fit a subject for photography located at a long or short distance into focus so as to take a photograph of it precisely.

The mobile communication terminal 20 according to the present disclosure may further comprise a lens protruding control module 30 and a button settling specification-storing buffer 31 so that damage to the camera lens 23 can be minimized even if the mobile communication terminal 20 is dropped on the ground during photography. The detailed explanations are as follows.

Each of FIGS. 7A and 7B displays the state in which information is stored by the button settling specification-storing buffer. As shown in FIGS. 7A and 7B, first and second buttons 22 and 24 can be set such that one of the two buttons is set as a photographing button and the other is set as a supporting button according to the user's choice. Like this, the photographing button and the supporting button can be set so that their settling functions are changed each other according to a user's choice. These settling information are stored in button settling specification-storing buffer 31.

When the photographing button (either first button 22 or second button 24) is pushed, lens protruding control module 30, in conjunction with button settling specification-storing buffer 31, checks whether the other button set as the supporting button is also pushed and thereby performs the function of protruding camera lens 23 outwardly or returning it to the main body.

For example, if first button 22 and second button 24 were set as the photographing button and the supporting button, respectively, the user could push first button 22 with a finger and also second button 24 with another finger at the same time, causing the lens to protrude once control module 30 determines that "main body 21 is stably supported." In this case, lens protruding control module 30 immediately communicates with terminal controlling module 25 and camera function module 35, thereby causing camera lens 23 to normally protrude outwardly from main body 21.

In contrast, if the user pushes first (photographing) button 22 but does not push the second (supporting) button 24 by mistake (or inevitably), lens protruding control module 30 determines that "main body 21 is in an unstable state." In this case, the lens protruding control module 30 would then immediately communicates with the terminal controlling module 25 and camera function module 35, thereby causing camera lens 23 to return to main body 21 or to maintain its original returned state.

In the same manner, if first button 22 and second button 24 were set as the supporting button and the photographing button, respectively, pushing the second (photographing) button 24 with a finger and the first (supporting) button 22 with another finger or the palm of his or her hand at the same time as shown in FIG. 6, would cause lens protruding control module 30 to determine that "the main body 21 is stably supported." Accordingly, lens protruding control module 30 immediately communicates with terminal controlling module 25 and camera function module 35, thereby causing camera lens 23 to normally protrude outwardly from main body 21.

In contrast, when the user pushes second (photographing) button 24 but does not push first (supporting) button 22, lens protruding control module 30 determines that "main body 21 is in an unstable state." Accordingly, lens protruding control module 30 immediately communicates with terminal controlling module 25 and camera function module 35, thereby causing camera lens 23 to return to main body 21 or to maintain its position if already in its original returned state.

Also according to an embodiment of the present disclosure, mobile communication terminal 20 comprises a photographed image position-adjusting module 32. Photographed image position-adjusting module 32 performs a function of finally producing an upright photographed image, i.e., an erect photographed image, even when the photographing is undertaken while mobile communication terminal 20 is turned upside down, as shown in FIG. 6.

As soon as camera function module 35 produces a photographed image and the photographed image is secured through terminal controlling module 25, photographed image position-adjusting module 32, in conjunction with button settling specification-storing buffer 31, automatically vertically adjusts the positions of the photographed image, based on the position of the photographing button.

FIG. 6 exhibits this function by showing a user take a photograph while mobile communication terminal 20 is turned upside down as shown, and second button 24 is set as the photographing button. Photographed image position-adjusting module 32 adjusts the vertical position of the photographed image so that it is produced upright on the screen, based on the position of second button 24.

Hereinafter, a method of controlling a photographing process with mobile communication terminal 20 according to an embodiment of the present disclosure will be specifically described.

Firstly, a user sets which one of first and second buttons 22 and 24 is used as a photographing or supporting button. Then button settling specification-storing buffer 31 stores and manages the button settings under the direction of terminal controlling module 25, thereby assisting lens protruding control module 30 and photographed image position-adjusting module 32, etc. to smoothly perform each of the functions.

The user then pushes the button set as a photographing button to commence the photographing process (S100). A detailed description thereof is as follows.

Lens protruding control module 30 continuously comparison-checks information outputted from terminal controlling module 25 and the information stored in button settling specification-storing buffer 31, thereby determining whether the button set as the photographing button is pushed or not (S1).

As a result of the determination in the step found in S1, pushing the button set as the photographing button sends an electronic signal checking whether the button set as the supporting button is also pushed (S2). This determination may be performed by lens protruding control module 30 which comparison-checks the information outputted from terminal controlling module 25 and the information stored in button settling specification-storing buffer 31 once more.

As a result of the determination in the step of S2, if the photographing button and the supporting button are pushed together, lens protruding control module 30 determines that "main body 21 is stably supported", and immediately transmits a signal requesting a start of the camera function or maintenance of the camera function already commenced (S5) and also transmits a signal requesting protrusion of camera lens 23 or maintenance of the protruded state as it is already positioned to terminal controlling module 25 and camera function module 35 (S6).

When the request signal is received, camera function module 35 immediately protrudes camera lens 23 to focus and then electronically processes the surrounding light received through camera lens 35 to produce a photographed image (S101).

Going back to S2, if the photographing button is pushed but the supporting button is not pushed, lens protruding control module 30 determines that "the main body 21 is unstable," and immediately transmits a signal stopping the camera from functioning or maintaining the camera in a stand-by state according to terminal controlling module 25 and camera function module 35 (S3). Then, it transmits a signal requesting a return of camera lens 23 to main body 21 or maintenance of camera lens 23 in its returned state (S4).

When the request signal is received, camera function module 35 immediately prevents the camera from functioning (or makes the camera remain in stand-by mode), or returns protruded camera lens 23 to main body 21 (keeps the camera lens inserted in the main body).

When camera lens 23 is returned to main body 21 or stably inserted into the main body 21, it is possible to considerably reduce the possibility of damage to the camera lens due to a shock even if the mobile communication terminal 20 is dropped on the ground.

When the photographing process (S101) is in progress, lens protruding control module 30 continues to check the information transmitted from terminal controlling module 21, thereby determining whether the required photographing process (both supporting and photographing buttons pressed) by camera function module 35 continues to be complete (S7).

As a result of the determination in the step found in S7, if the photographing process is not completed, lens protruding control module 30 reacts according to the step found in S2 and will continue to check whether the supporting button is pushed or not.

Contrary to the scenario found in S7, when the photographing process is complete, the lens protruding control module 30 immediately transmits a signal informing of the completion of a production of the photographed image to photographed image position-adjusting module 32 via terminal controlling module 25.

Figure 9:
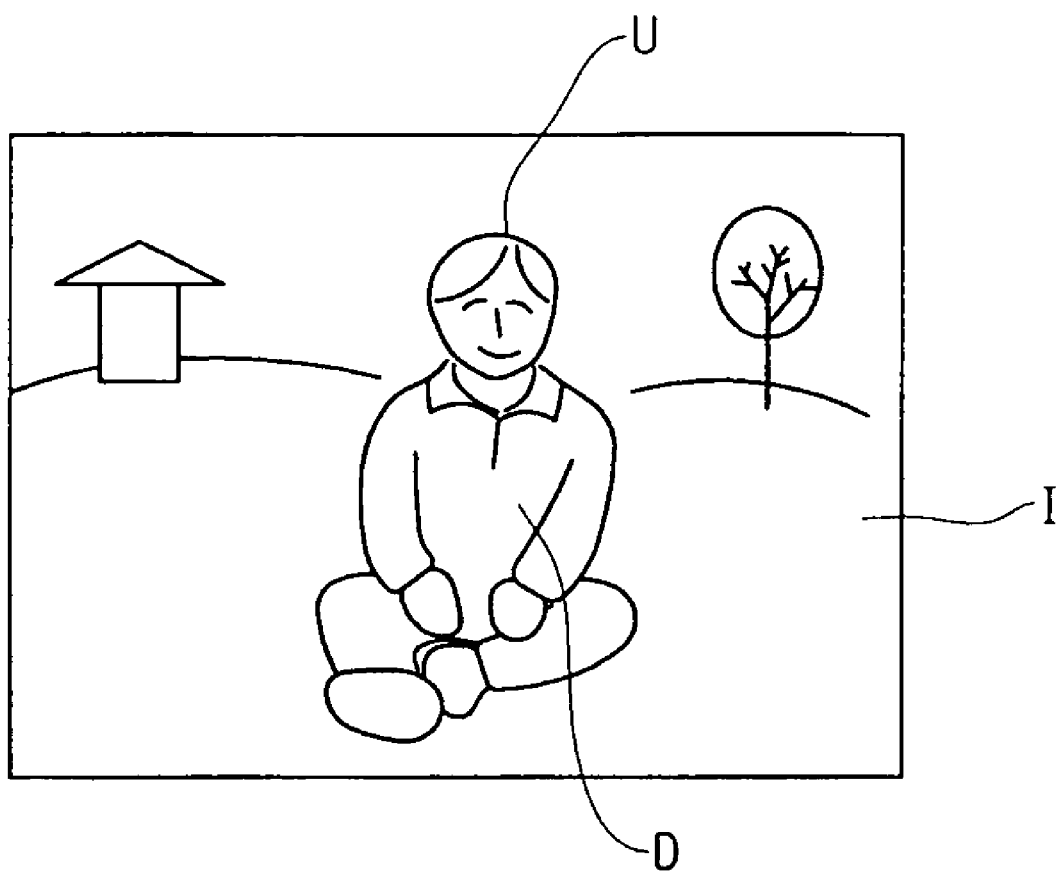
FIG. 9 shows a photographed image which is vertically adjusted to an upright position by a photographed image position-adjusting module according to an embodiment of the present disclosure.

The photographed image position-adjusting module 32, having received the signal, immediately operates a series of image-adjusting routines to automatically adjust the vertical positions of the photographed image (I) produced by the camera function module 35, based on the position of the photographing button (the first or second button 22, 24), as shown in FIG. 9 (S8).

For example, as shown in FIG. 6, even though the user takes a photograph with the mobile communication terminal 20 turned upside down, if second button 24 is set as the photographing button, photographed image position-adjusting module 32 adjusts the top of the photographed image (I) to correspond with the direction of the position of second button 24. Accordingly, the vertical position of the photographed image (I) produced on screen is inverted to the positioning of first button 22 when it is set as the photographing button. This is how the user can obtain an upright photographed image in case of FIG. 6.

The photographed image (I), which is vertically adjusted, is then transmitted to terminal controlling module 25 (S9) by photographed image position-adjusting module 32, which is finally stored in the photographed image storing module 27 (S102).

As described above, according to the present disclosure, when a user takes a photograph, a protruding of the camera lens is basically excluded and the camera function is not performed unless the mobile communication terminal is stably supported. Accordingly, it is scarcely possible for the user to drop the mobile communication terminal while photographing and even less possibility of damage to the camera lens resulting from the terminal being dropped.

In addition, according to the invention, even when the user takes a photograph when the mobile communication terminal is turned upside down, the finally produced image will be upright.

The present disclosure is not limited to mobile communication terminals and may be useful on the whole in various electronics which use a camera lens.

While the present disclosure have been shown and described with reference to certain preferred embodiments, it will be understood by those skilled in the art that various changes in form and details may be made thereto without departing from the spirit and scope of the disclosure as defined by the appended claims.

What is claimed is:

1. A device having a camera function, comprising:
a main body having a camera lens;
a photographing button and a supporting button each mounted to an outside of the main body;
a camera function module to perform a camera function according to states of the photographing button and the supporting button to produce a photographed image; and
a lens protruding control module to control a camera lens to protrude from the main body if both the photographing button and the supporting button are depressed, and to retract into the main body if the photographing button is depressed while the supporting button is not depressed,
wherein the camera function module performs the camera function only if both the photographing button and the supporting button are depressed.

2. The device according to claim 1, wherein the photographing button and the supporting button are mounted to opposing surfaces of the main body, respectively.

3. The device according to claim 1, wherein settling functions of the photographing button and the supporting button can be changed with respect to each other according to a user's choice.

4. The device according to claim 1, further comprising a photographed image position-adjusting module to automatically adjust the direction of top of the photographed image produced by the camera function module, to be correspondent with the direction of a position of the photographing button.

5. A method of controlling a photographing process of a device having a camera function module, comprising the steps of:
determining whether a photographing button is depressed
determining whether a supporting button is depressed if the photographing button is depressed; and
controlling a camera lens to protrude from a camera main body if both the photographing button and the supporting button are depressed, and to retract into the camera main body if the photographing button is depressed while the supporting button is not depressed.

6. The method according to claim 5, further comprising a step of automatically adjusting the direction of top of the photographed image produced by the camera function module, to be correspondent with the direction of a position of the photographing button.

* * * * *

UNITED STATES PATENT AND TRADEMARK OFFICE
CERTIFICATE OF CORRECTION

PATENT NO. : 7,574,130 B2 Page 1 of 1
APPLICATION NO. : 11/311047
DATED : August 11, 2009
INVENTOR(S) : Woo Sung Kim It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 399 days.

Signed and Sealed this

Seventh Day of September, 2010

David J. Kappos
*Director of the United States Patent and Trademark Office*